US010463039B2

(12) United States Patent
Carvalho

(10) Patent No.: US 10,463,039 B2
(45) Date of Patent: Nov. 5, 2019

(54) DECOY

(71) Applicant: Mark J. Carvalho, Broomfield, CO (US)

(72) Inventor: Mark J. Carvalho, Broomfield, CO (US)

(*) Notice: Subject to any disclaimer, the term of this patent is extended or adjusted under 35 U.S.C. 154(b) by 196 days.

(21) Appl. No.: 15/655,860

(22) Filed: Jul. 20, 2017

(65) Prior Publication Data

US 2019/0021305 A1   Jan. 24, 2019

(51) Int. Cl.
*A01M 31/06* (2006.01)

(52) U.S. Cl.
CPC .................... *A01M 31/06* (2013.01)

(58) Field of Classification Search
CPC .................................................. A01M 31/06
See application file for complete search history.

(56) References Cited

U.S. PATENT DOCUMENTS

| | | | |
|---|---|---|---|
| 812,499 A | 2/1906 | Johnston | |
| 2,799,961 A | 7/1957 | Jaumotte | |
| 3,800,457 A * | 4/1974 | Barrett | A01M 31/06 428/16 |
| 4,689,913 A * | 9/1987 | Brice | A01M 31/06 43/3 |
| 4,928,418 A | 5/1990 | Stelly | |
| 5,392,554 A * | 2/1995 | Farstad | A01M 31/06 43/3 |
| 5,595,012 A * | 1/1997 | Coleman | A01M 31/06 43/3 |
| 5,787,632 A * | 8/1998 | Kraut | A01M 31/06 135/901 |
| 5,983,552 A | 11/1999 | Nelson | |
| 6,216,382 B1 * | 4/2001 | Lindaman | A01M 31/06 248/156 |
| 6,374,530 B1 | 4/2002 | Mierau | |
| 6,385,895 B1 | 5/2002 | Scaries | |
| 6,708,440 B2 | 3/2004 | Summers et al. | |
| 6,874,270 B2 | 4/2005 | Lorenz | |
| 7,028,429 B1 | 4/2006 | Druliner | |
| 9,402,386 B1 * | 8/2016 | Otwell | A01M 31/06 |
| 2005/0268522 A1 * | 12/2005 | Foster | A01M 31/06 43/3 |
| 2009/0249678 A1 * | 10/2009 | Arnold | A01M 31/06 43/2 |
| 2009/0260273 A1 * | 10/2009 | Rogers | A01M 31/06 43/2 |
| 2012/0180371 A1 * | 7/2012 | Roe | A01M 31/06 43/3 |

* cited by examiner

*Primary Examiner* — Christopher R Harmon
(74) *Attorney, Agent, or Firm* — Kyle W. Rost

(57) ABSTRACT

A profile decoy frame and cover are sized for the frame to tension the cover. A compression loop in a top run of the frame allows forcible compression of the frame length for application and subsequent tensioning of the cover. The cover provides a largely featureless surface of a dark color with iconographic accents suggestive of the game animal. The frame provides a ground stake set inward from the opposite ends of the frame, yet offset from center of the frame, allowing the decoy to pivot across the wind.

12 Claims, 5 Drawing Sheets

DECOY

BACKGROUND OF THE INVENTION

Field of the Invention

The invention generally relates to fishing and trapping. More specifically, the invention relates to decoys and equivalent devices designed primarily to allure forms of animal life. The decoys of the invention are formed into a semblance of a game bird such as a duck or goose and are designed to attract such wild game birds within range of a hunter's gun. The specifically preferred decoy is a goose decoy.

Description of Related Art

Decoys are designed to attract flocks of game birds such as geese that are passing in flight. A hunter places decoys in sufficient number to create the impression of a landed flock, as this impression is known to attract a passing flock. Perhaps as an adaptation for safety and survival in nature, a passing flock will tend to land where it appears another flock is already present. Thus, a hunter will position his decoys near his hunting blind in hope that a live flock will approach to land nearby.

Two important and closely related requirements for successful use of decoys are that individual decoys are sufficiently realistic to attract the passing flocks of game birds and a group of such decoys sufficiently simulates group activity to be believable to the passing flocks of birds. These two requirements are met in different combinations of features in the decoys, often strongly influenced by the practicality of the hunting environment. The chief practicality is that the hunting blind should be remote from any indication of the hunter's presence. As a ready consequence, the hunter will walk to the blind from a considerable distance so that the blind is widely separated from such human equipment as cars. The hunter typically must carry his decoys over the considerable distance to the blind. Of course, the hunter must carry all of his other gear, as well. The size and mass of decoys and other gear becomes critical due to the hunter's limited ability to handle all such equipment over a long hike.

A hunter can carry a large number of flat decoys in a single trip to his hunting blind. Three-dimensional decoys can be far more lifelike because they can be rendered to almost any degree of realism, but large size and weight tend to be prohibitive for the hunter to carry a great number of these on a single trip. Therefore, a long-standing problem in the design of flat decoys it to produce decoys that, despite the lack of three-dimensional appearance, perform realistically in the field to reliably attract flocks of game birds.

A flat or approximately planar decoy, referred to as a silhouette or profile decoy, is desirable from the perspective that such decoys can be lightweight and small in volume. These decoys are characterized by being flat or almost planar, and while a certain amount of the third dimension of thickness inevitably must be present, the thickness tends to be uniform like a board of sheet of plastic. From the perspective that the animal is much more three-dimensional than the profile decoy, the thickness is not a lifelike imitation of the third dimension of the animal. The thickness tends to not be shaped like the side profile or silhouette of the animal. Profile decoys made from a single piece of rigid board with a picture of an animal printed on each side, as seen in U.S. Pat. No. 6,874,270 to Lorenz. Profile decoys can be formed of a frame with a fabric covering. For transportation, profile decoys are best carried disassembled. The frames can be carried in an efficient bundle, and the covers can be carried in a separate bundle. Once the hunter reaches the blind, he can assemble the covers to the group of frames and deploy the assembled decoys.

Decoy covers have various configurations that strongly influence decoy behavior. A type of decoy known as a windsock decoy is more three-dimensional than a profile decoy. A windsock decoy often has a cover that is bag-like to catch the wind and serves as a windsock to turn the decoy into the wind. Some hunters are strongly opposed to windsock decoys even when they employ three-dimensional decoys and they endeavor to prevent decoys from turning under wind force. U.S. Pat. No. 4,869,913 to Brice expresses a strong preference for using a forked anchor rod to prevent a decoy from rotating in the wind. Similarly, U.S. Pat. No. 4,928,418 to Stelly discloses an anchor rod configured with a stabilizer bend that is pushed into the ground to prevent the decoy from twisting in the wind. U.S. Pat. No. 5,595,012 to Coleman further prevents the decoy from turning in the wind by staking it with two stakes. U.S. Pat. No. 5,983,552 to Nelson prevents the decoy from turning by supporting it on the ground by at least two supporting feet and possibly additional supports. U.S. Pat. No. 6,354,530 to Mierau employs a baffle on a mounting stake to prevent the decoy from rotating in the wind.

Some decoys are formed from at least two frame subcomponents, such as a separate body portion and a separate head portion. A separate cover can be applied to each, as seen in U.S. Pat. No. 5,983,552 to Nelson and in U.S. Pat. No. 6,354,530 to Mierau. The separate covers can be better adapted to the different shape characteristics of the two frame subcomponents. However, this solution expands the hunter's work in the field since he must apply a cover to each of two frame subcomponents and then assemble the covered frame subcomponents to form each full decoy.

Other types of assembly present additional problems. Particularly when a frame and cover are each of one-piece design, the difficulty in field-fitting the cover can damage the frame by undue bending. A bent frame may not support its cover in the intended way, perhaps resulting in loss of satisfactory decoy appearance or loss of the cover in high wind conditions. The hunter can attempt a field-repair of a bent frame, although such repair can be difficult in typically cold and windy field conditions. Further, such repairs might be compounded if recurring in plural decoys of a decoy flock.

A profile or silhouette decoy faces the problem of being flat or lacking a substantial third dimension, which is unrealistic as compared to a living animal such as a goose or other game bird. To compensate for the flatness, profile decoys have been decorated to increase realism. One attempt to increase realism is to paint or color the cover surface to closely imitate the appearance of the living animal. Thanks to advanced photo technology, it is possible to apply photorealistic surface decoration to a fabric cover or to almost any other type of surface. However, this use of photorealism has not always been well thought out or successful.

Another attempt to increase realism is to orient the profile decoys in a realistic manner. Geese and other birds typically land into the wind, take off into the wind, and frequently stand facing into the wind, perhaps to be ready for takeoff, instantaneously. Knowing this, hunters often try to orient a flock of decoys to face into the wind, thinking this will increase realism. A three-dimensional windsock decoy typically is needed to obtain good response to wind. Three-dimensional decoys have a body cavity that serves as a windsock to catch the wind and turn the decoy into the wind at all times, as seen in U.S. Pat. No. 6,385,895 to Scaries. Other decoys are staked to the ground in a fixed orientation, and the hunter must reorient them when the wind changes direction, if the hunter wishes to follow conventional thought.

Two recent patents show a direction of thought in decoy development, sometimes with direct conflict of idea. The first is U.S. Pat. No. 6,374,530 to Mierau, which discloses a profile decoy formed of a two-part frame, including both a body frame and a separate, attachable head frame. Steel banding forms each part of the frame to produce up-and-down frame motion when struck by wind. A separate decorated sock covers each part to form an assembled decoy that resembles a goose. The decoy is staked to the ground in such a manner that it cannot rotate in the wind, but the covering can ripple in the wind, giving the appearance of feather movement.

The second recent patent is U.S. Pat. No. 7,028,429 to Druliner, which discloses another two-part decoy formed of head portion and body portion. The body is three-dimensional, in that it is both wide and hollow, such that it functions as a windsock to turn the entire decoy into the wind. The entire decoy is mounted to the ground from a stake at the head portion. The stake is at an extreme front end of the decoy and is formed of a cantilever spring rod. When the wind strikes the trailing decoy body, the wind imparts bobbing motion to the decoy body and pivots the body from the front end of the decoy. The extreme mounting of the support stake at the head of the decoy converts the entire decoy into a wind vane, further assuring that the decoy will face into the wind at substantially all times.

These two patents reflect the conception that decoys are more realistic if they move with up-and-down bobbing motion; but they also reflect the controversy over whether decoys should pivot into the wind or whether decoys should hold a fixed orientation as placed by the hunter.

It would be desirable to improve the profile decoy in numerous respects. Particularly, it would be desirable to achieve improved realism when deployed. Such improved realism might be in actual or perceived motion.

Further, it would be desirable to achieve improved realism by surface decoration that is complementary to the two-dimensional presentation of a profile decoy.

Additionally, it would be desirable to provide a frame structure that readily accommodates the field application of a cover to a profile frame without damaging or deforming the frame.

Also, it would be desirable to create a frame structure that preserves the fit of the cover, maintaining an interactive relationship between the frame and cover.

Finally, it would be desirable to create a profile or silhouette decoy that is structured to interact with wind not only by turning into the wind, but also by showing a bank-and-forth, pivoting and twisting, milling-around activity to suggest lifelike real-time variability of pose.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide a profile decoy that appears, moves, and orients itself in a manner that takes advantage of the substantially two-dimensional nature of such a profile decoy.

Another object is to provide a profile decoy frame that reliably receives and supports a cover in a way that enables the decoy to move and orient itself in a manner that takes advantage of the substantially two-dimensional nature of such a profile decoy.

A further object is to improve the profile decoy in numerous respects, in particular to achieve improved realism when deployed. Such improved realism might be in actual or perceived motion.

An additional object is to achieve improved realism by surface decoration that is complementary to the two-dimensional presentation of a profile decoy.

A more specific object is to provide a frame structure that readily accommodates the field application of a cover to a profile frame without damaging or deforming the frame.

Another more specific object is to create a frame structure that preserves the fit of the cover, maintaining an interactive relationship between the frame and cover.

According to the invention, a profile decoy is formed of a frame and a cover. Preferably, the frame is formed of a single continuous elongated element having first and second ends. The first end is intermediate the front and rear extremes of the decoy and defines a ground stake at this intermediate location. The elongated element extends laterally and upwardly from the ground stake to define a decoy body in side profile. The decoy body is cantilevered toward the front or rear end from the intermediate or central ground stake and is configured in an open pattern characterized by a substantial gap defined along the bottom run of the decoy body between the ground stake and the second end of the frame. The cover is shaped to fit the side profile established by the frame. The cover has an open bottom for admitting the decoy body and is sized to fit in tension over the frame. The frame also forms a compression loop in a top run of the decoy body for permitting the frame to be forcibly compressed in length while the cover is applied. When the compression is released, the frame expands to tension the cover. The ground stake is suitably positioned along the length of the decoy to allow interaction with ambient wind to variably position the profile across the wind.

The accompanying drawings, which are incorporated in and form a part of the specification, illustrate preferred embodiments of the present invention, and together with the description, serve to explain the principles of the invention. In the drawings:

BRIEF DESCRIPTION OF THE SEVERAL
VIEWS OF THE DRAWINGS

DETAILED DESCRIPTION OF THE INVENTION

Figure 1:
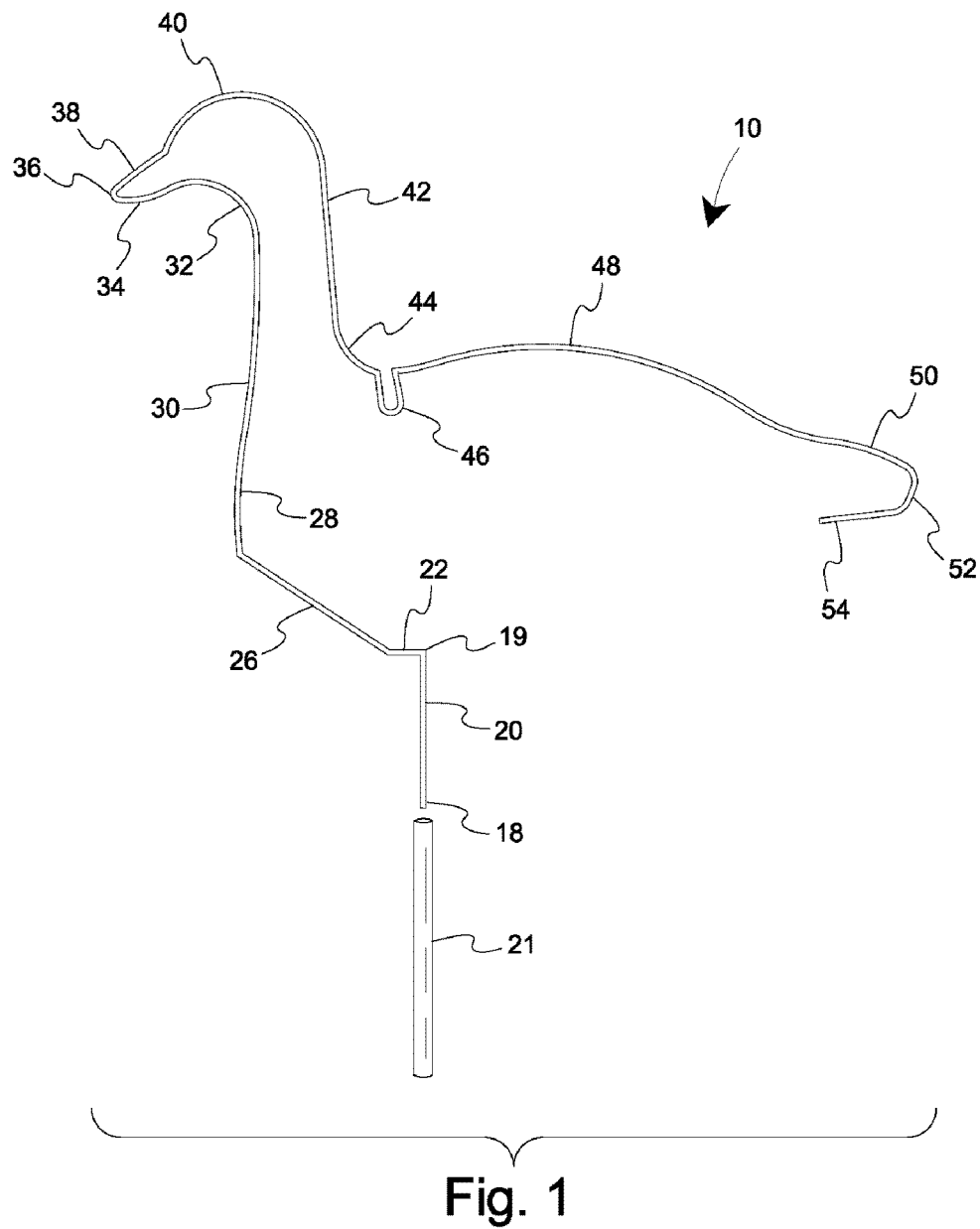
FIG. 1 is a side elevational view of a decoy frame in sentinel position, also showing a mounting tube.

The invention is a profile decoy that is readily assembled in the field and that imparts a new motion to individual profile decoys and to entire simulated flock of such decoys. The ready assembly and the new motion derive from the configuration and interaction between a frame and a cover. The frame is configured to tension the cover so as to avoid strong windsock action while imparting bird-like motion in response to wind striking the decoy. The frame includes special adaptation for receiving the cover over both head and body areas in reasonable tension and with reasonable ease. The frame also provides a base rod, ground stake, or standard uniquely positioned to mount the decoy to the ground or to a ground-based receiver while supporting the decoy for the new motion. The decoy is configured to produce parallax motion when struck by wind. The decoy employs a lightweight frame using very little elongated material such as wire to form a partial profile of an animal with a fabric drape of lightweight material hung from the top of the frame.

The decoy carries enabling surface symbolism that produces a coordinated impression of realism in a profile decoy. Rather than following the modern trend to apply a photo realistic surface image to a decoy, the invention enhances the realism of a profile decoy by building upon the unrealistic flatness of the shape. The decoy cover has largely featureless surface decoration. Where surface decoration is present, it is uniquely iconographic. This new type of surface marking recognizes that extreme realism on the surface of an unrealistically shaped decoy may result in a disadvantage. When a passing bird is able to discern the familiar, fine detail of a photo realistic decoy surface, the detailed perception tells the bird that his view of the decoy is clear and accurate. At the same time the passing bird may discern the unrealistic flatness of the profile decoy, which coupled with the bird's perception that his view is clear and accurate, can alert him that the decoy is false. In this situation, photo-realism can be a disadvantage if it reveals and emphasizes the flatness. The bird might be driven away rather than attracted. Thus, presenting lifelike, three-dimensional detail on a non-lifelike, primarily two-dimensional contour can draw undue attention to the deficiency.

Further contrary to conventional thought, the invention sometimes orients the profile decoy across the wind, pivoting into and out of the wind rather than holding a steady course into the wind. This movement is arbitrary and simulates the milling-about activity of a recently landed flock. This new orientation recognizes that orienting a profile decoy into the wind is likely to be harmful to achieving realism. Wind can vary in a complex manner. The direction of wind at bird's flying altitude may differ from the direction of wind at the ground boundary layer. Consequently, a passing flock of birds may attribute almost no significance to the direction faced by a decoy on the ground. Further, birds in flight do not necessarily fly in any fixed direction with respect to ambient wind direction. Whether a passing flock initially sees a group of profile decoys from a favorable side view is more a matter of chance than a product of the decoys' being oriented into the wind.

Live birds assume a predictable direction of flight at least at one time, which is when the live flock is approaching for landing. The live flock flies into the wind for landing. That is also the time when a flock of profile decoys that is facing into the wind loses its slim claim to realism. A conventional profile decoy has substantially no visible presence when viewed directly from the front or rear. The width of the decoy from front or rear might be about one-half inch. With this almost non-existent third dimension, the profile decoy becomes alarmingly unreal and almost disappears at the sole predictable orientation to the attracted live flock. Thus, a two-dimensional profile decoy using a conventional windsock design or a wind vane design presents the substantially non-existent third dimension to the wind, resulting in the live bird overlooking the decoy as the live bird approaches the decoy flock from the direction that is against the wind. The decoy of the invention employs a tensioned cover and suitably places a supporting standard to allow ambient wind to orient the decoy across the wind at least some of the time, with the result that at least some decoys of a decoy flock might be displayed with best realism when an approaching live flock is landing into the wind.

Figure 2:
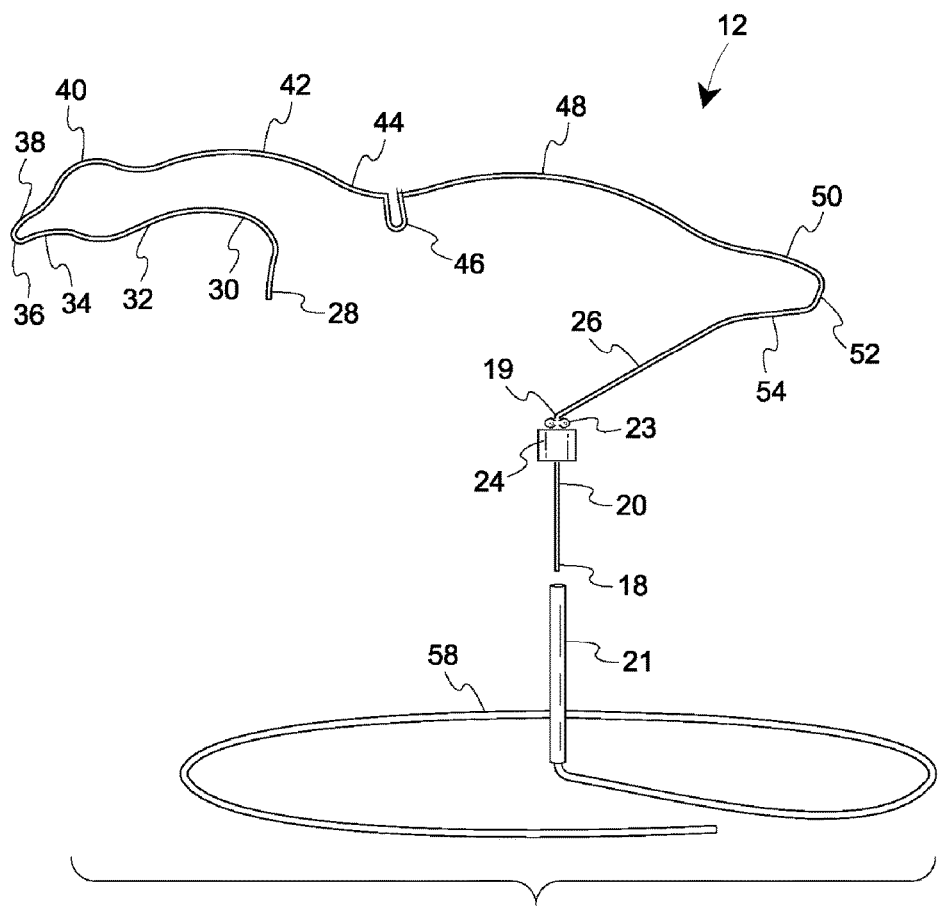
FIG. 2 is a side elevational view of a decoy frame in caller position, also showing a mounting tube and stand.
Figure 3:
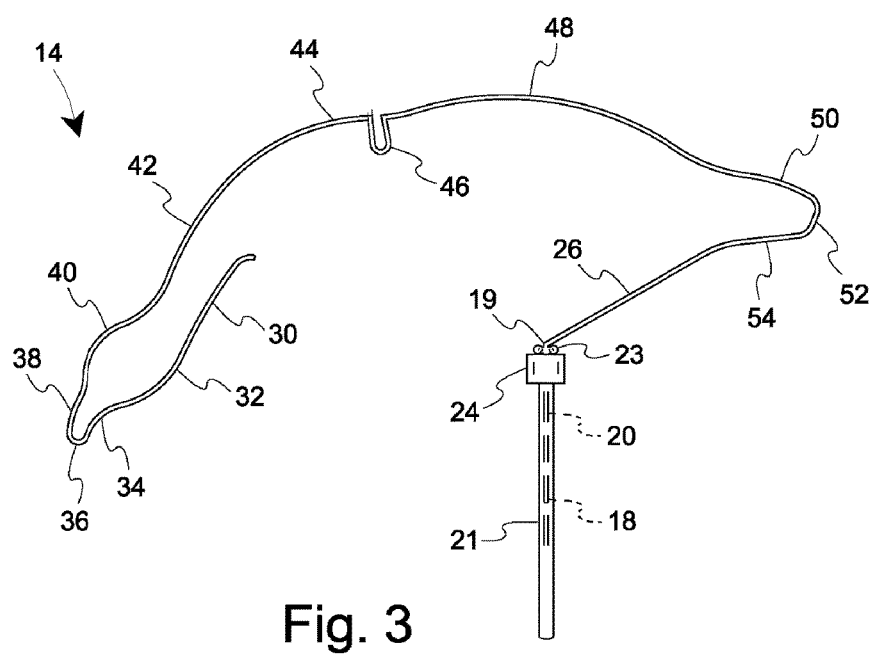
FIG. 3 is a side elevational view of a decoy frame in feeder position, with the stake portion shown in phantom within a mounting tube.

With reference to the drawings, a profile decoy is formed in a shape or pose that resembles a bird performing a characteristic function in a flock. FIGS. 1-3 show examples of frames for goose decoys in such poses. The decoy frame 10 of FIG. 1 shows a goose with upright head and neck. A goose in this pose is called a sentinel. The decoy frame 12 of FIG. 2 shows a goose with head and neck extended forward. A goose in this pose is called a caller. The decoy frame 14 of FIG. 3 shows a goose with head and neck extended toward the ground. A goose in this pose is called a feeder. Decoys, optionally in a mixture of these poses and perhaps others, can be combined to set up a decoy flock that presents the impression of geese engaged in various characteristic functions.

Figure 4:
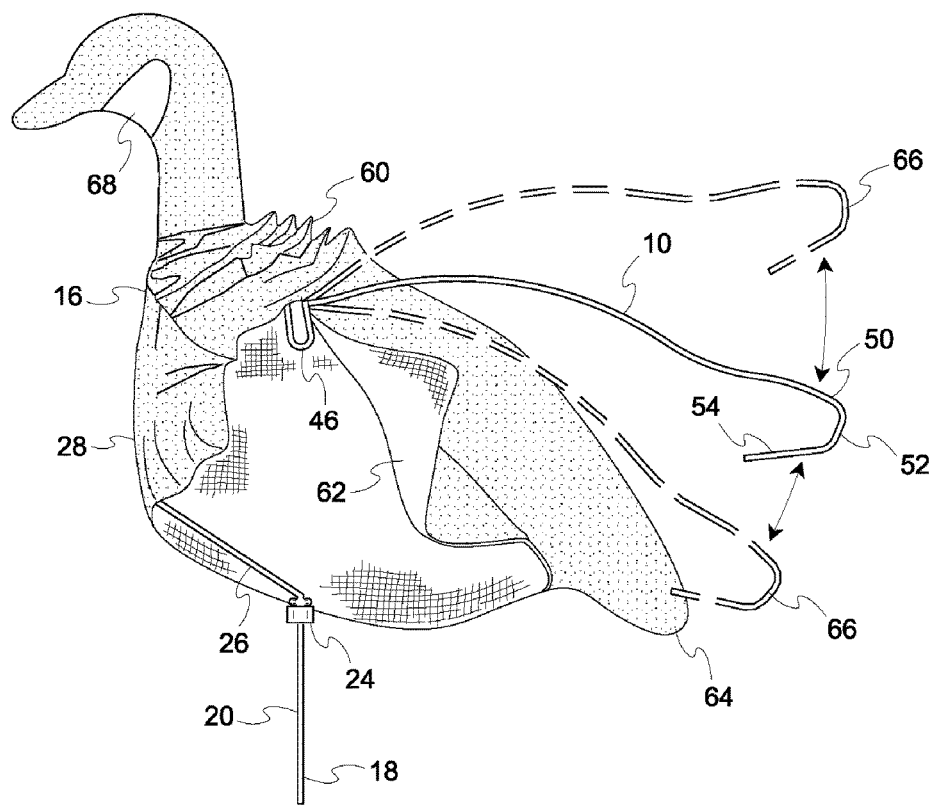
FIG. 4 is a side elevational view of a decoy with cover partially applied to a frame, showing covered portions of the frame in phantom.
Figure 5:
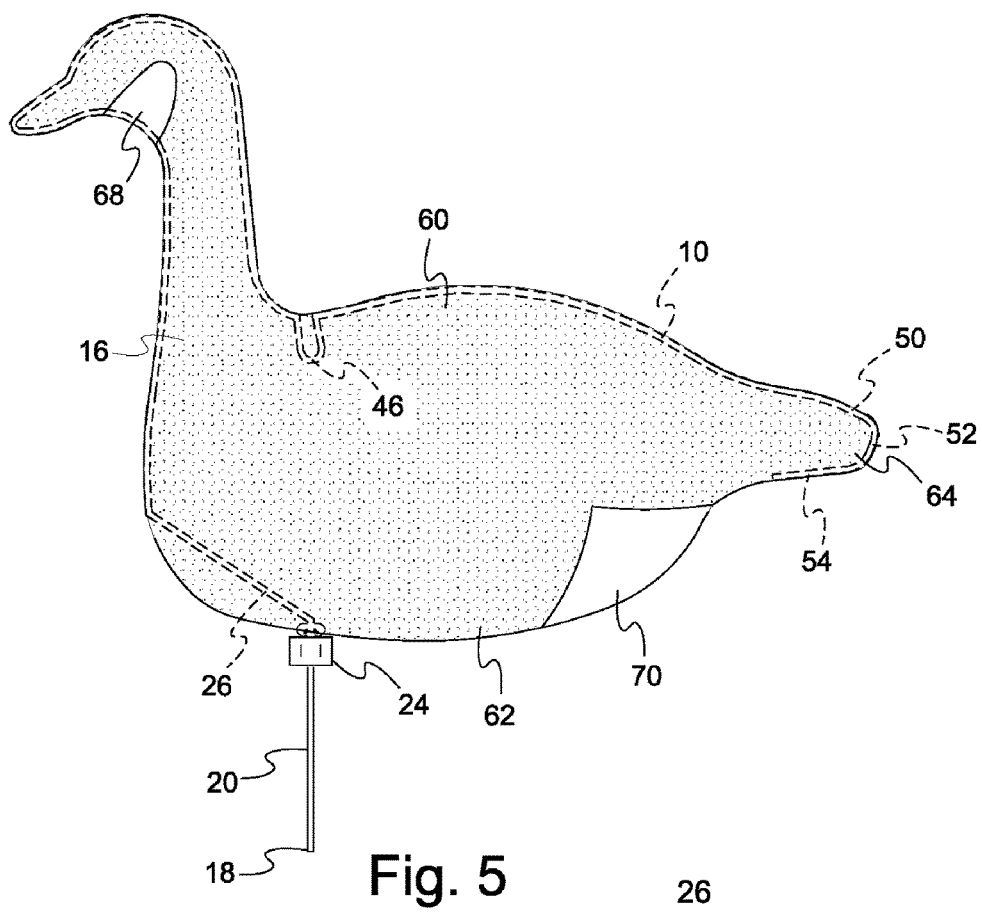
FIG. 5 is a side elevational view of a decoy with cover fully applied to the frame, showing portions of the frame under the cover by hidden lines.

The pose of each decoy is the product of interaction between a frame and a cover. FIGS. 4 and 5 show a fabric cover 16 applied over the frame 10 with a tensioned upper portion and a draped lower portion. A similar combination of tensioned upper and draped lower portion of a cover is readily translated to other frame profiles, such as frames 12 and 14. The cover is formed to approximately match the animal profile established by the frame.

The frames meet three interrelated structural requirements: the frame is an incomplete, open partial profile; the frame is configured with a feature tensioning the fabric cover when it has been applied; and the frame includes motion control features for producing a new decoy motion.

The incomplete, open partial profile contributes to an overall lightweight frame structure. The frame is formed of an elongated element having opposite, first and second ends. The elongated element is a thin, resilient, deformable material that is configured to define key shape elements of the pose. A thin wire, rigid enough to retain an assigned shape, is a suitable choice. For convenient reference, the frame will be referred to as being made of wire, without limiting the chosen material of the frame. Other choices include resilient, deformable plastic materials that can be configured into a suitable shape and can retain the shape. The frame might be bent, molded, cast, or extruded. The frame is incomplete and open in that it terminates at the second end without closing the bottom of the body profile. The second end is distant from the first, establishing a gap in the frame at the bottom of the decoy body.

The various frame poses can be formed of a series of common elements, which can be variously ordered. Two notable elements are a pivot mechanism and a gap between the pivot mechanism and an opposite end of the frame, both of which are intermediate the opposite, front and back extreme ends of the frame. As described, below, a suitable pivot mechanism is formed of two elements: a generally vertical rod and a receiver for the rod, formed of a generally vertical, hollow core tube. The rod and tube are sized to fit together in a mutually pivotable relationship. One of these elements is located as the aforementioned terminal segment of the frame. The other of these elements is located on a ground mount that carries the frame. The drawings illustrate the depending end segment of the frame as being formed of a wire or rod, while the ground mount is illustrated as being formed of the hollow core tube. It is also acceptable to reverse the two elements, using hollow core tube as the end segment of the frame and using a rod as the ground mount. The drawings show the preferred arrangement.

In the deployed frame pose of FIG. 1, at starting end 18 the wire or rod extends upwardly, generally vertically as deployed, and forms the ground stake, which also can be called a base segment or standard 20. The ground stake extends from the starting end 18 at its bottom to a bend 19 at its top. With respect to the remainder of the frame and the partial profile of the animal, the ground stake is configured to be placed as a substantially vertical element as it supports the decoy during deployment in the field. The vertical placement is both to optimize the display and to allow the frame to pivot readily with the ground stake while the decoy is in deployed position.

The ground stake 20 is associated with a ground mount 21, which together with the ground stake 20 serves as a means for permitting the decoy frame 10 to readily turn or pivot while in its deployed position. A first such means for permitting turning is a ground mount that is a mounting tube 21 having a hollow center. The ground mount 21 is either partially inserted generally vertically into the ground or supported in a vertical position on a platform stand, FIG. 2. The hollow center of such a tube 21 coaxially fits over the ground stake 20 with sufficient room that the ground stake can pivot on the common axis with the ground mount to rotate within the tube 21. Such pivoting of the ground stake 20 is accompanied by a turning of the remainder of the decoy frame 10.

To enhance the ability of the decoy frame 10 to pivot with respect to the ground mount, the decoy frame 10 is configured with an insertion limiting means that limits how far the ground stake 20 can be inserted into the tube 21. A suitable insertion limiting means is the bend 19 in the frame 10 at the top of the ground stake, producing a laterally extending stop segment 22. Preferably the stop segment is oriented toward either the front or rear of the body profile. In use, the stop segment rests against the top end of the tube 21 and supports the remainder of frame 10 against the top end of tube 21. The stop segment 22 might be a segment of the frame that is bent approximately ninety degrees from the vertical position of the ground stake 20, with a suitable length of about one inch, and otherwise sized and configured to retain the tube 21 below the stop segment. Thus, in this embodiment, the decoy frame employs a ground mounting tube 21 sized to receive the ground stake 20 in the tube 21. The stop segment 22 is sized to contact the upper end of the tube 21, thereby limiting the insertion distance, and hence limiting the friction of the ground stake within the mounting tube. The contact area between the top of tube 21 and the side of stop segment 22 is small and produces very little friction that might retard the frame from pivoting in the tube. In these ways, the interface of the ground mount 21 with the stop segment 22 serves as a friction break between the ground tube and ground stake, enabling the frame to pivot freely with respect to the ground mount 21.

A second means for permitting pivoting could employ a reversal between the ground stake 20 and ground mount 21. By reversing the geometry of these parts, a hollow vertical tube is used as the depending end segment of the decoy frame 10. A vertical rod is used as the ground mount that is received in the tube to pivotally carry the frame.

Figure 6:
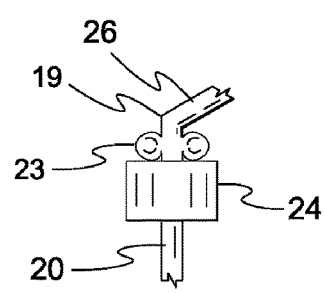
FIG. 6 is an enlarged detail view of a stop and collar on a frame near the top of the stake portion of the frame.

Another embodiment of the insertion limiting means is a stop 23 formed near the top end of the ground stake 20, near the top bend 19, for the purpose of retaining a low friction rotary sleeve 24 below the stop 23 to serve as a friction break collar, described below. FIG. 6 shows details of the stop 23, sleeve 24, and the top bend 19 from the somewhat modified frame arrangement shown in FIGS. 2 and 3. From the top bend 19 of FIGS. 2 and 3, the wire establishes a cantilevered connection to the remaining portion of the frame from the top of the standard 20. From the top bend 19 the wire extends with a horizontal component following a front-to-rear axis of the decoy frame. Thus, above the enlarged stop 23, the wire extends acutely toward either the front or rear of the body profile, depending upon the chosen pose.

An interconnecting segment 26, which for functional efficiency may be formed of straight lengths rather than being perimetric to the assembled decoy, extends toward the head or tail of the decoy from the top bend 19 to a first perimetric portion of the frame. Segment 26 may be disposed with an upward and horizontal slant. In the example frame of FIG. 1, the interconnecting segment 26 extends upwardly and horizontally from stop segment 22, and the first perimetric portion of the frame is a head and neck profile. A starting perimetric length of wire forms the chest curve 28, which blends smoothly into the front neck curve 30, leading into the throat curve 32 and lower beak curve 34. A sharp, reversing nose curve 36 is located at the forward extreme of the frame following the lower beak curve. A top extent of the frame begins with an upper beak curve 38, top head curve 40, a top back neck curve 42, and a top base of neck curve 44, which complete the head and neck profile. An open wire loop 46 is located near the base of neck curve.

The remainder of the frame in FIG. 1 is the open body profile. A top back curve 48 follows the open wire loop 46. The back curve blends into a top tail curve 50. A reversing back-of-tail curve 52 follows the top tail curve. An end-of-tail segment 54 completes the example profile of FIG. 1. The end-of-tail segment 54 also is the second end of the wire, with the result that the frame is open along the bottom of the body from the end of segment 54 forward to the vertical ground stake 20. This opening may be about fourteen to fifteen inches long, which may be on the order of one-half to two-thirds of the body length as measured from the stake 20 to the termination of the wire at the end of tail segment 54. The opening eliminates undue mass from the frame and enables the frame to move with lifelike motion.

The example frames of FIGS. 2 and 3, as well as the detail view of FIG. 6, differ from FIG. 1 at least in that the first perimetric portion of the frame following the interconnecting segment 26 is to the rear. From standard 20, the interconnecting segment 26 extends to the tail, joining the end-of-tail segment 54. The sequence of frame body elements continues in reverse order through tail curve 52, top tail curve 50, and top back curve 48, to wire loop 46 at the base of the neck. Next, the head and neck profile continues forward from wire loop 46, beginning with top base of neck curve 44 and continuing through intermediate elements 42, 40, 38, 36, 34, and 32. The profile of FIG. 2 continues through front neck curve 30 and terminates after chest curve 28. The lowered head profile of FIG. 3 requires no chest curve and terminates after front neck curve 30. The frames of FIGS. 2 and 3 are open along the bottom from the second end of the wire at the front ending point of segment 28 or 30 back to the vertical base segment 20, which opening is about twelve inches long, or about one-half of the body length as measured from the stake 20 to the termination of the wire at the chest curve 28 or front neck curve 30, as appropriate.

In any of FIGS. 1-3, the frame defines only the key elements of the pose as a necessary to support a draped cover that defines the remaining elements. The head and neck embody key elements and for this reason have frame segments at both top and bottom edges. The body and tail embody key elements primarily only along the upper edge with minor bottom frame definition at the bottom of the tail. The frame is an open loop in which a gap or opening covers about one-half or more of the lower edge of the body. However, in addition to the roughly half-opening of the lower edge, as a preferred option the majority of the remaining lower edge is substantially non-perimetric, as exemplified by interconnecting segment 26. The interconnecting segment 26 serves to place the standard 20 with respect to the body, establishing a cantilevered relationship wherein the body will tend to rock at the top of the standard. A straight, non-perimetric element 20 efficiently serves this purpose with minimal addition of weight. Accordingly, the frame enables the decoy to be ultra-light in weight and to move in lifelike manner when struck by ambient wind.

Thus, the decoy frame 10, 12, 14 is formed of a single continuous elongated element having first and second ends. The frame is configured at the first end 18 to define a ground stake 20. The frame extends laterally and upwardly from the ground stake to define a decoy body in side profile. The profile has an open pattern, which is cantilevered with respect to the ground stake. In approximate terms, the decoy body is composed of several runs of the elongated element. These runs might be called a front run, a top run, a bottom run, and a rear run of the elongated element. In approximate terms, the front run might include such elements as the front neck curve 30, the throat curve 32, and the lower beak curve 34. The top run might include the upper beak curve 38, the top head curve 40, the top base of neck curve 44, and a compression loop 46. The bottom run might include the chest curve 28 and the end-of-tail segment 54. The rear run might include the top tail curve 50 and the back-of-tail curve 52. The open pattern is characterized by a substantial gap defined along the bottom run of the decoy body between the ground stake 20 and the second end. The position of the ground stake might be defined as offset centrally from the front and rear runs and offset toward a lengthwise end from the center of the profile body. This positioning of the ground stake establishes a pivot axis positioned to allow the decoy to enter an across-the-wind position.

The tensioning feature of the frame is embodied in the compression loop 46 near the base of neck curve 44, approximately at the junction of the body and neck portions of the frame. The compression loop is an open loop bend in the frame material. Particularly where the frame material is resilient wire, this loop acts as a spring that allows the length of the frame to be forcibly flexed or compressed to easily fit into the fabric cover. Then, when compression is released, the profile recovers and expands to original dimensions to hold taut the fabric drape. The loop 46 at the base of neck curve also causes a secondary point of flex to the wire, which imparts a compound wobble and bounce to the wire's motion when in moving air. The open frame bottom aids compression loop 46 in performing this function by allowing the loop 46 to serve as sole controller of flexure. A suitable compression loop is U-shaped with the arms of the "U" nearly perpendicular to the juxtaposed wire of the frame profile. For example, in the three profiles of FIGS. 1-3, the arms are disposed at between eighty and ninety degrees from the top back curve 48. For a frame formed of three-sixteenths inch aluminum wire, suitable arms may be about one inch in length, interconnected by a semi-circular arc of about one-quarter inch radius.

Motion control features include the mounting stake or standard 20 formed as part of the frame and located at a position offset from the center of the frame but also offset from the front-to-rear bounds of the body. The standard 20 should be vertical with respect to the deployed decoy so that the standard can turn or pivot with the decoy. A nearly vertical standard allows the decoy to spin or pivot with realism. The standard 20 is a sole support for a deployed decoy. It may be possible to insert the standard into the ground to deploy the decoy, but the preferred deployment employs a mounting tube 21, shown in FIGS. 1-3, sized in length and diameter of central passage to receive the stake or standard. The mounting tube can be inserted into the ground to serve as a fixed base for the decoy, or the mounting tube can be supported on the surface by a ground support stand 58, shown in FIG. 2. The standard 20 is inserted into the top of the mounting tube 21, which then carries the standard with low friction to allow the decoy to pivot and turn.

In the embodiments of FIGS. 2-6, the standard 20 carries a low friction sleeve or collar 24 near the top of the standard, in a position to be in contact with the top of mounting tube 21 when deployed, as shown in FIGS. 3-4. The sleeve 24 can be formed of a low friction material such as a plastic. The plastic sleeve provides low friction between the standard and base tube, allowing the frame to swivel freely with respect to the base tube. The stop 23 supports sleeve 24 at the top of the standard 20. The stop 23 can be an enlargement formed integrally with the standard, such as by swaging, and may have the form of swaged wings as shown in the enlarged detail view of FIG. 6. The top end of mounting tube 21 rests against the bottom of the sleeve 24.

The tensioning features of the frame assist the motion control features by holding the cover 16 under suitable tension to prevent undue windsock effect. The cover is formed of left and right side layers or panels of sheet material joined together along a front-to-rear contour matching the upper portion of the frame, such as the animal's head, neck, back and tail of the frame profile. The cover need not match the loop 46. The cover can be formed of a lightweight fabric such as rip stop nylon. The cover is further cut or formed to define the intended profile of the decoy. In the pose of FIG. 4, the two sheets of the cover are joined together at the front of the frame as low as the chest curve 28. At the rear of the frame, the two sheets are joined together as low as the end of tail segment 54. The front and rear tensioning features of the frame, such as the chest and tail, maintain the attached portions of the two sheets close to one another such that little windsock effect is possible. In FIG. 3 the front tensioning feature is the head and neck of the frame, which interacts with the tail to achieve a similar tensioning.

The tensioning features of the frame are configured to physically retain the cover against inadvertent lifting from the frame, such as by wind. The head and neck of the frame strongly retain the cover against lifting. The cover hooks over the back of the tail segment to complete the physical retention at both front and rear ends of the frame. The cover is sized such that the front and rear ends of the frame will hold it in tension between them, at least through a top portion of the cover.

The cover can be constructed in two portions, including an upper portion 60 and an optional lower portion 62. In the upper portion 60 as described above, the two side panels of the cover are joined together, such as by sewing at the perimeter. Thus, the upper portion can be described as a sack with open bottom, where the closed edges of the sack match front, top, and rear portions of the frame. The open bottom of the sack receives the frame for assembly. The upper portion 60 of the cover 16 receives the upper portion of the frame and provides a tensioned upper structure of the assembled decoy.

The optional lower portion 62 of the cover 16 includes one or more side panels that depend from the open bottom of the upper portion and are generally open or separate from one another below the open bottom of the upper portion 60. The bottom portion 62 of the cover may be open between the two cover layers of sheet material, other than as connected to the upper portion. For example, between the chest curve 28 and the end-of-tail segment 54 of FIG. 4, the bottom edge of the cover is open. The sides of the cover are draped below the supported, tensioned upper portion 60 of the cover. Optionally, only one side of the cover 16 is required to form the lower portion 62. In FIGS. 4 and 5 the cover is open between the neck curve and tail segment. The lower, draped portion of the cover need not be under the same tension as the upper portion. Because the lower portion is open or composed of only a single side layer of fabric, it is incapable of acting as an effective windsock. Even when both layers of fabric extend into the lower portion of the cover, wind coming between the open, draped portions exerts only minor directional force on the decoy as a whole and is easily released.

FIGS. 4 and 5 show application of the cover 16 to the frame 10. The open bottom of the cover provides access for the neck and head portion of the frame to enter the sleeve-like neck and head portion of the cover. FIG. 4 shows the resulting preliminary application over the neck and head frame, with a loose portion of cover 16 bunched at the neck of the frame 10 near loop 46. The remaining loose portion of the cover 16 is applied by moving the tail of the frame as required to hook the tail 64 of cover 16 over the tail end curve 50 of the frame. FIG. 4 shows two frame tails 66 in phantom at orientations suggesting possible flexure of the body of the frame at wire loop 46 to allow the rear end of the cover to engage the tail of the frame. Loop 46 provides a contained area for controlled flexure of the frame. When loop 46 is released, the frame springs back to fully extended configuration of FIG. 5 and tensions the cover. The loop 46 provides the necessary flexure of the frame and thereby protects the profile of the frame from arbitrary bending deformation as the cover is being applied. Because loop 46 protects the animal profile, the frame will fit the cover 16 properly after the cover is applied. This setup method lessens the time required of a hunter in the field to assemble and deploy a flock of decoys in the field and ensures that the cover and decoy frame will be able to interact in the intended manner.

The cover carries iconographic marking that contributes to the effectiveness of the profile decoy to attract flocks of birds. As previously noted, these markings differ from the popular trend of employing photorealism in decoys. In the example of a goose decoy as shown in the drawings, the cover is monochromatic over a majority of its area. The preferred coloration of major areas is dark and preferably black. Minor but shrewdly chosen exceptions to the uniform black coloration provide the symbolic visual suggestion of a goose. These exceptions are a simple triangular patch of a light, contrasting color. For example, a white cheek patch 68 and a white triangular rump patch 70 under the tail are suitable iconographic accents. These symbolic features provide a minimal suggestion of a goose. Coupled with a profile style decoy, the iconographic marking is remarkably effective for attracting flocks of geese.

The advantages of using iconographic markings on a profile decoy are best understood by considering the dynamic interaction between the decoy and the passing flock of birds. A profile or silhouette decoy is substantially two-dimensional. Such a shape is far from realistic, other than in profile. However, profile decoys can be highly effective to attract live birds when their appearance is coordinated with the phenomenon of parallax.

Parallax is defined as the apparent displacement or apparent movement of an object caused by the change in the position of the observer. For example, when driving past a forest of trees, the trees appear to shift amongst themselves as the viewer's eye point passes by them. As a bird flies over a field of silhouette decoys, the bird will perceive different degrees of realism as his viewpoint of the decoys changes. The decoys will also appear to shift position as the viewing angle changes.

As previously discussed, an overly realistic cover pattern of surface markings can be detrimental as applied to a profile decoy. Too much detail in surface markings can make obvious that the decoy is merely a silhouette, lacking a substantial width. A passing bird might realize this difference too easily when the decoy presents full detail of color markings and physical surface features, since the profile presentation inherently displays these details on an unrealistically contoured, flat, vertical shape. The use of monochromatic, dark field coloration on the majority of the profile decoy can avoid such easy detection. A dark or black coloration is suitable to impart an aura of shape familiarity to the passing flock of birds without conveying too much surface marking detail or too readily calling attention to the silhouette aspect of the decoy. The selective use of iconographic contrasting patches 68, 70 provides an accent that supplements the familiarity of appearance without drawing attention to the two-dimensional aspect of the decoy.

While the disclosed shape and surface marking of the decoy is specific to a goose, minor changes in profile and iconographic marking can adapt the decoy to attract other game birds, such as ducks. The chosen iconographic accent markings should correspond to the more significant and apparent color variations of the goose, duck, or other animal. As a guideline, the iconographic markings should be those areas of the animal that would first appear or that would be first noticeable if the animal were moving from a dark area toward a better-lit area. The dark color of the majority of the fabric, coupled with a spare use of iconographic accents, combine to extend an aura of familiarity about the decoy without inspiring the game animal to make greater inquiry.

In addition to obtaining the benefits of parallax, a good decoy and flock of decoys can improve the impression of realism by appropriate physical movement. A three-dimensional decoy is known to mimic the actual behavior of geese on the ground by using wind to select or direct their orientation. The present decoys employ wind in a new way. The decoy structure receives the wind to enhance the parallax behavior of the silhouette decoy, relative to birds looking from a distance. The decoy is structured to sometimes face perpendicularly into the wind while pivoting on a wire standard 20 mounted in the hollow tube 21 supporting the decoy from the ground.

The wire standard 20 is positioned to allow the decoy to swing perpendicular to wind. The standard 20 is an initially vertical section of wire that is located below the fabric body 16 of the decoy. Preferably, the placement of the vertical section 20 is not at the central axis of the decoy. Rather it is best offset from the central axis, with that offset varying according to the decoy type. With reference to a decoy sized as a goose, which might be from three to three and one half feet in length, the placement of the vertical section 20 is behind the central axis, varying in distance from 1 inch to 6 inches in distance for a head-down goose decoy such as the feeder and caller decoy patterns. The placement of the vertical section 20 is ahead of the central axis by a distance of 1 inch to 3 inches in distance for a head-up goose decoy such as the sentinel decoy pattern.

The draped fabric cover 16 flutters from the wire standard 20, catching the breeze or wind like a sail. As the sail-like cover 16 fills with wind, the standard 20 rotates about the mounting tube 21 causing the cover 16 to dump the wind. In turn, the cover 16 is free to again be caught by the wind and to rotate back against the wind in an approximately perpendicular orientation, catching more air into the cover. This process repeats itself. Locating the vertical wire standard 20 at a longitudinal position slightly offset from the central axis of the decoy allows the unique half rotation behavior just described.

A profile decoy of the kind described is formed by first bending a rigid, resilient wire into a partial profile of a waterfowl. An aluminum wire of about three-sixteenths inches diameter and about six feet in length is a suitable starting material. The stake 20 is formed from about a six-inch section of the wire that is a straight, vertical segment that fits into the mounting tube 21, which is of sufficient interior diameter to receive the stake 20 with sufficient clearance to allow the stake to turn when in the tube.

According to one embodiment of the friction break, at the top of the straight segment 20, a crimp 23 in the form of swaged wings is formed in the wire. This crimp 23 acts as an upper stop for a low friction element such as a plastic washer or a short segment of plastic tube 24 that is placed over the wire stake 20 just below the crimp. This plastic tube 24 acts as a friction break between the tube 21 and the wire profile, allowing the profile to rotate and swing freely. The mounting tube 21 can be set into the ground in a substantially vertical orientation to receive the standard 20.

In a variation of the friction break, at the top of the straight segment 20, the wire frame is bent to form a laterally extending stop segment 22 that rests against the top of the ground mount 21 with sufficiently low friction that the frame can turn with respect to the ground mount.

In a further variation, the standard 20 might be a tube with hollow center and the ground mount 21 might be a rod that fits within the tube and allows the tube and frame to turn. If the standard 20 is the tube, the ground mount 21 is configured with appropriately relocated insertion limiting means. For example, a stop segment 22 would be located in the ground mount rod 21 and would be spaced down the rod by an allowable insertion distance. Similarly, swaged wings 23 would be spaced down the rod of the ground mount by an allowable insertion distance and the plastic sleeve 24 would rest on top of the wings 23.

In another variation that is especially suited for ground that is frozen or that the mounting tube 21 otherwise cannot readily penetrate, a ground platform or stand 58 can provide a broad base to carry the mounting tube 21.

The wire forming the remainder of the partial profile is bent such that it cantilevers outward and preferably upward from the vertical standard 20, which suspends the remainder of the wire as a horizontal carrier from which a fabric cover 16 is draped. For frame 10, the interconnect wire 26 is about six and one quarter inches long and angles upward from stake 20 at about one hundred and twenty-three degrees to the front. The net result is that the stake is set back from the front of the sentinel frame by about nine to ten inches. For frames 12 and 14, that stake 20 is about six and one-half inches long, the interconnect wire 26 is about seven and one-half inches long and angles upward from stake 20 at about one hundred and twenty degrees to the rear. The net result is that the stake is set back from the rear of the caller and feeder frames by about eleven to twelve inches.

The overall frame dimensions vary slightly due to different extension of the head and neck in the several profiles. All profiles may employ substantially the same body profile, starting from the loop 46 and extending backwards through the back curve 48, top tail curve 50, tail back 52, and tail end 54. The length of this body profile is about eighteen to nineteen inches, including the loop 46. From the front of loop 46 to the front of the sentinel frame profile of FIG. 1, the length of the profile is about nine to ten inches. Thus, a typical overall length for a sentinel decoy frame is twenty-seven to twenty-nine inches. For the caller profile of FIG. 2, from the front of loop 46 to the front of the frame, the length of the profile is about fourteen to sixteen inches. Thus, a typical overall length for a caller decoy frame is thirty-two to thirty-five inches. For the feeder profile of FIG. 3, from the front of loop 46 to the front of the frame, the length of the profile is about twelve to thirteen inches. Thus, a typical overall length for a feeder decoy frame is thirty to thirty-two inches.

The fabric cover 16 is shaped as the silhouette of the waterfowl. This fabric cover flutters from the wire frame, catching the breeze or wind on a broad surface like a sail, causing the decoy to pivot and swivel randomly about the base of the standard, presenting the profile at various viewing angles to approaching animals, simulating the flurry and commotion of a flock of birds upon the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A profile decoy, comprising:
   a frame formed of a single continuous elongated element having first and second ends, configured at the first end to define a ground stake and extending laterally and upwardly from said ground stake to define a decoy body in side profile with an open pattern, cantilevered with respect to the ground stake, wherein the decoy body is composed of a front run, a top run, a bottom run and a rear run of the elongated element, and the open pattern is characterized by a substantial gap defined along the bottom run of the decoy body between the ground stake and the second end;
   a cover shaped to fit the side profile of said frame, having an open bottom for admitting the decoy body, and sized to fit between said front run and rear run in tension;

a compression loop configured in the top run of the decoy body for permitting the frame to be forcibly compressed between front and rear runs for receiving said cover over the front and rear runs and for tensioning the cover between the front and rear runs when the forcible compression is released.

2. The profile decoy of claim 1, wherein with respect to the length of the profile body, said ground stake is offset centrally from said front and rear runs and offset toward a lengthwise end from the center of the profile body, thereby establishing a pivot axis positioned to allow the decoy to enter an across-the-wind position.

3. The profile decoy of claim 2, comprising a monochromatic dark color on a majority of said fabric cover.

4. The profile decoy of claim 3, further comprising an ichnographically shaped patch of light color on a minority of said fabric cover.

5. The profile decoy of claim 1, wherein:
said ground stake further comprises an enlarged stop near the top end of the ground stake and a sleeve carried on the ground stake below the stop;
wherein the stop is sized to retain the sleeve below the stop; and said decoy further comprises a ground mounting tube sized to receive said ground stake in the tube and sized to contact the lower face of the sleeve;
whereby the sleeve serves as a friction break between the ground tube and ground stake, enabling said frame to rotate freely with respect to the ground tube.

6. The profile decoy of claim 1, wherein:
said ground stake further comprises a laterally extending stop segment at a position near the top end of the ground stake;
said decoy further comprises a ground mounting tube sized to receive said ground stake in the ground mounting tube and sized to contact the lower face of the stop segment against the top of said ground mounting tube;
whereby the stop segment carries said frame against the top of the ground mounting tube.

7. A profile decoy of an animal, formed of a frame and a cover, configured for deployment in an upright position, wherein:
a first section of said frame is configured as a partial profile of said animal and defines front and rear end profiles of the animal, an upper portion of said first section defines an upper edge between said front and rear end profiles, said upper edge forming an open topped compression loop that allows the frame to be forcibly compressed at the front and rear end profiles and to resiliently recover upon release of the force, and a lower portion of the first section defines a gap in the frame between bottoms of the front and rear end profiles;
a second section of the frame is configured as a base rod oriented to mount the decoy in said upright deployed position and to pivot the decoy across ambient wind;
said cover is formed of a top cover portion and a bottom cover portion;
said top cover portion is configured as a sack with open bottom, shaped in profile similar to the animal profile of said upper portion of the frame, and is sized such that when engaged over the frame at the front and rear end profiles, the top cover portion places said open topped compression loop in compression, thereby tensioning the top cover portion against ballooning in wind and retaining the top cover portion on the frame; and
said bottom cover portion depends from the open bottom of the top cover portion and provides at least one draped layer of sheet material configured similarly to the animal profile of said lower portion of the frame.

8. The decoy of claim 7, wherein the animal is a goose, and the cover is black in color with iconographic white areas.

9. The decoy of claim 7, wherein the animal is a goose, said cover includes a throat area and an under-tail area, and the cover is black in color with white areas at said throat area and at an under-tail area.

10. The decoy of claim 7, further comprising:
a tube sized to receive said base rod;
a friction break sleeve carried on the base rod and sized to rest against the top of said tube when the base rod is received in the tube; and
wherein the base rod has a stop near the top end thereof supporting said sleeve below the stop.

11. The decoy of claim 10, wherein said stop is an enlargement in said base rod.

12. The decoy of claim 9, further comprising:
a tube sized to receive said base rod;
a laterally extending stop segment on the base rod, positioned to contact the top of said tube when the base rod is received in the tube; and
wherein the stop segment supports said first section of the frame on the top of the tube.

* * * * *